(12) United States Patent
Ash et al.

(10) Patent No.: US 9,003,688 B2
(45) Date of Patent: Apr. 14, 2015

(54) SPIN AND CASTING ROD WITH AUTOMATIC LINE RELEASE

(71) Applicants: Stephen Richard Ash, Lafayette, IN (US); Thomas A. Sullivan, Pine Village, IN (US)

(72) Inventors: Stephen Richard Ash, Lafayette, IN (US); Thomas A. Sullivan, Pine Village, IN (US)

(*) Notice: Subject to any disclaimer, the term of this patent is extended or adjusted under 35 U.S.C. 154(b) by 84 days.

(21) Appl. No.: 14/059,490

(22) Filed: Oct. 22, 2013

(65) Prior Publication Data

US 2014/0109461 A1 Apr. 24, 2014

Related U.S. Application Data

(60) Provisional application No. 61/795,590, filed on Oct. 22, 2012.

(51) Int. Cl.
*A01K 71/00* (2006.01)
*A01K 91/02* (2006.01)
*A01K 87/00* (2006.01)

(52) U.S. Cl.
CPC ............ *A01K 91/02* (2013.01); *A01K 87/00* (2013.01)

(58) Field of Classification Search
USPC .................... 43/4.5, 25, 4; 242/223
See application file for complete search history.

(56) References Cited

U.S. PATENT DOCUMENTS

| 2,846,804 | A | | 8/1958 | Elliott | |
|---|---|---|---|---|---|
| 3,050,898 | A | | 8/1962 | Bernd | |
| 3,069,800 | A | * | 12/1962 | Ransom | 43/25 |
| 3,499,242 | A | * | 3/1970 | Tucker, Sr. | 43/25 |
| 5,346,158 | A | | 9/1994 | Epperson | |
| 5,430,968 | A | * | 7/1995 | Watkins et al. | 43/25 |
| 5,890,379 | A | * | 4/1999 | Robinson | 43/25 |
| 6,032,892 | A | | 3/2000 | Epperson | |
| 8,061,074 | B2 | * | 11/2011 | Lou | 43/15 |
| 8,336,249 | B2 | * | 12/2012 | Newton | 43/19 |

* cited by examiner

*Primary Examiner* — Christopher P Ellis (74) *Attorney, Agent, or Firm* — D'Hue Law LLC; Cedric D'Hue; Stephen Farris (57) ABSTRACT

Devices for automatic fishing line release during a cast using the acceleration and deceleration of the rod to automatically release the fishing line. In one embodiment, the device is in an under-the-rod position. In another embodiment, the devices is in an over-the-rod position. In other embodiments, the over or under the rod function is determined by manufacturer or user adjustments or changes.

20 Claims, 8 Drawing Sheets

SPIN AND CASTING ROD WITH AUTOMATIC LINE RELEASE

CROSS-REFERENCE TO RELATED APPLICATIONS

This application claims the benefit of U.S. Provisional Ser. No. 61/795,590, filed Oct. 22, 2012, titled Spin and Casting Rod with Automatic Line Release, the disclosure of which is expressly incorporated by reference.

FIELD OF THE DISCLOSURE

The current disclosure relates to an automatic line release (ALR) device for spin and casting rods including over-the-rod reel and under-the-rod reel configurations.

BACKGROUND

The challenges of releasing a fishing line at the optimum time while casting are well known. To do this manually takes skill and timing. In some devices the force or drag on the line releases the line based on speed of the cast or weight of lure. In other devices centrifugal force on a weight determines the time of line release, and with this approach a fast cast releases fishing line sooner than a slow cast.

(1) Description of Related Art

U.S. Pat. No. 2,846,804 discloses a device to release a fishing line based on the tension on the line created by centrifugal forces on the lure during the cast. This approach does not account for light weight lures creating much less tension on the line than heavier lures. The line tension depends upon the weight of the lure and speed of the cast, resulting in continual adjustments for various lures and speeds of cast. Other approaches include sensors with weights to detect the angle position of the rod during the cast, but failed to take into account the acceleration forces during the cast which makes sensors inaccurate.

U.S. Pat. No. 3,050,898 discloses a device to release a fishing line based on the angular bend of the fishing rod to open a passage for the fishing line. U.S. Pat. No. 6,032,892 discloses a device to release a fishing line based on the centrifugal force of the cast to move a nose plate of a reel to hold the line in place until the centrifugal force decreases. This approach also will release the line at differing portions of the cast, depending upon the speed of the cast.

BRIEF SUMMARY OF THE INVENTION

In the present invention, angular acceleration and angular deceleration are used with an ALR device, to release the fishing line at about the same angle of cast, independent of speed or weight of lure.

A device is described comprising a lever to hold and release fishing line during a cast. A clamp holds and subsequently releases the fishing line when the lever senses change in direction of angular acceleration of fishing rod. The device is attached to the fishing rod in an over-the-rod configuration or an under-the-rod configuration.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

FIG. 7A1 is an exploded view of another embodiment of the automatic line release device.

FIG. 7B1 is an exploded view of another orientation of the automatic line release device of FIG. 7A1.

FIG. 7A2 is a top perspective view of the automatic line release device of FIG. 7A1.

FIG. 7B2 is a top perspective view of the automatic line release device of FIG. 7B1.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENT

The embodiments disclosed below are not intended to be exhaustive or limit the disclosure to the precise forms disclosed in the following detailed description. Rather, the embodiments are chosen and described so that others skilled in the art may utilize their teachings.

Wherever appropriate, any mention of plurality in this description of embodiments includes singulars and any mentions of the singulars also include plurals.

Figure 1:
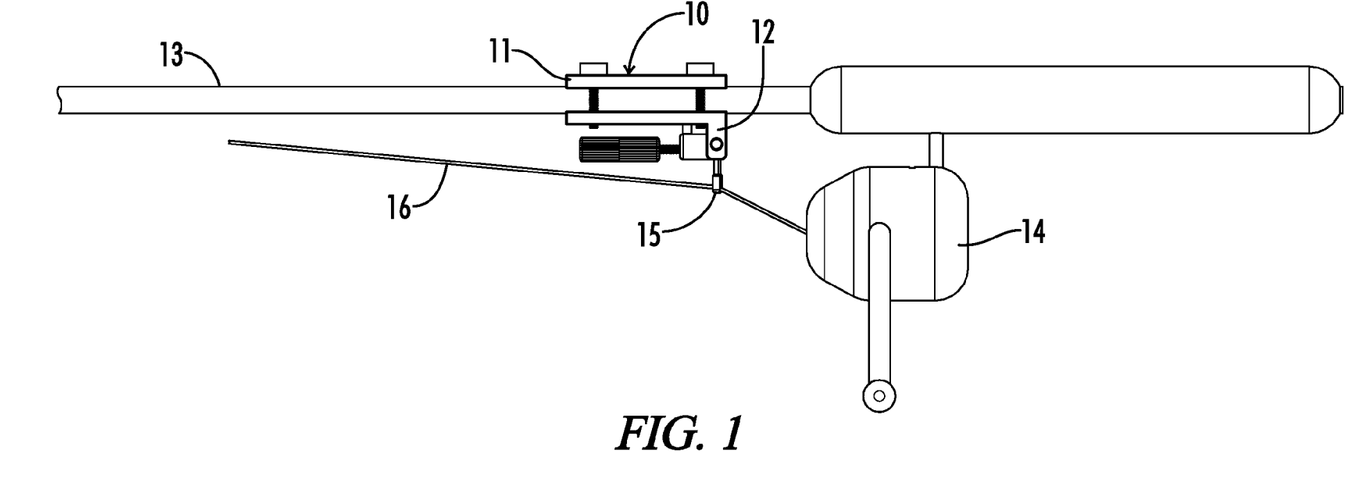
FIG. 1 is a side view of automatic line release (ALR) device in the under-the-rod configuration with the fishing line placed into the clamp.
Figure 2A:
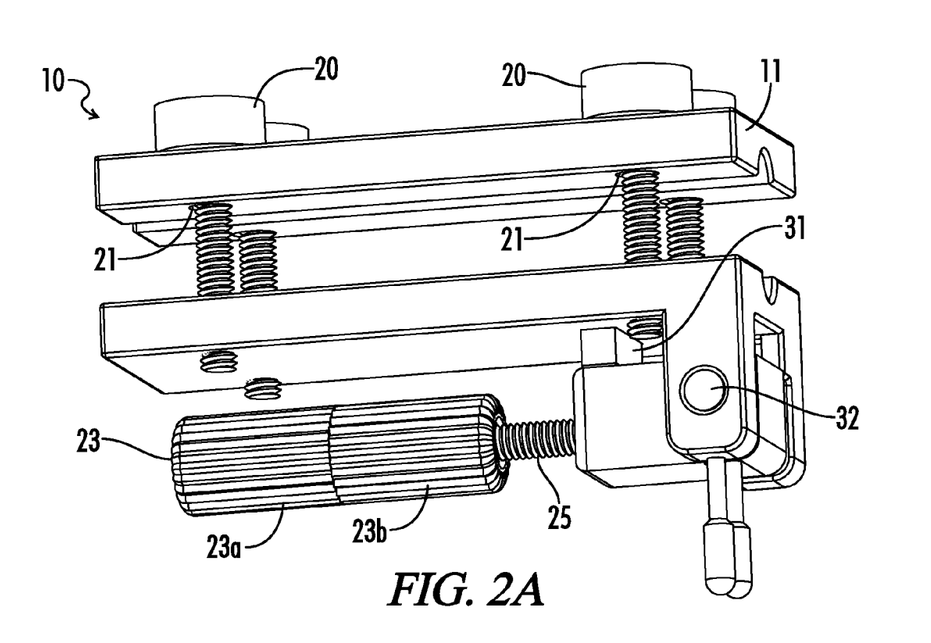
FIG. 2A is a side perspective view of the ALR device of FIG. 1 in an under-the-rod configuration. The spring tension moves the weight towards the rod (i.e., parallel with the rod), holding the line clamped between the two posts. The movable post is behind the stationary post (i.e., further away from the weight and/or closer to the reel).
Figure 2B:
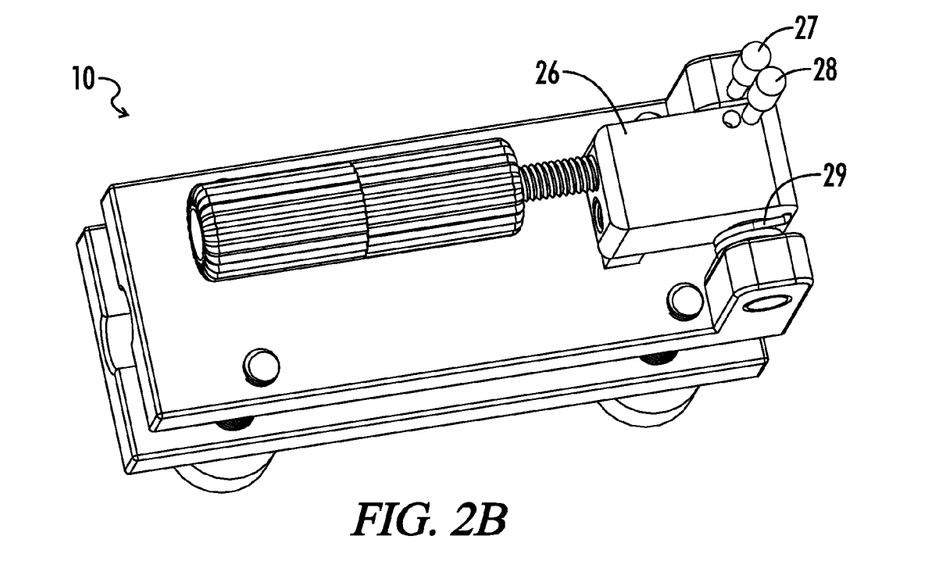
FIG. 2B is a bottom perspective view of the ALR device of FIG. 2A in an under-the-rod configuration.

In an embodiment of the present disclosure, under-the rod device 10 is illustrated in FIGS. 1 and 2. Base 11 and plate 12 are attached to rod 13 in front of reel 14. The attachment is secured by four thumb-tightened screws 20. Base 11 and plate 12 each define elongated holes 21 to accommodate screws 20. Coupling base 11 and plate 12 allows under-the-rod device 10 to accommodate tapered fishing rods. Reel 14 is shown below rod 13. In this embodiment weight 23 is located on weight rod 25. Weight 23 includes two weight portions 23a and 23b. When portion 23a is located away from portion 23b, both portions rotate freely for adjustment. When portion 23a is located adjacent to portion 23b some rotation and/or adjustment of each portion is precluded. Weight rod 25 connects to pivoting block 26 that rotates on axle 32. Attached to pivoting block 26 is movable post 28 that moves with pivoting block 26. Movable post 28 contacts stationary post 27 that is fixed in position and attached to plate 12.

Spring 29 is coupled to pivoting block 26 and plate 12 and keeps weight 23 normally in a position close to (i.e., parallel to) rod 13, so that movable post 28 and stationary post 27 form clamp 15 to hold line 16. In one embodiment of the present disclosure, moveable post 28 and stationary post 27 are close to one another. In an exemplary embodiment, posts 27 and 28 are separated by less than the diameter of one of posts 27 or 28. This configuration creates mechanical advantage by permitting a relatively small force exerted by spring 29 and weight 23 to exert a large force on line 16 held between clamp 15. After the lure is drawn near the end of rod 13, line 16 is inserted between movable post 28 and stationary post 27 while pulling weight 23 downward slightly (i.e., away from rod). Reel 14 is then set to allow free casting.

Figure 3A:
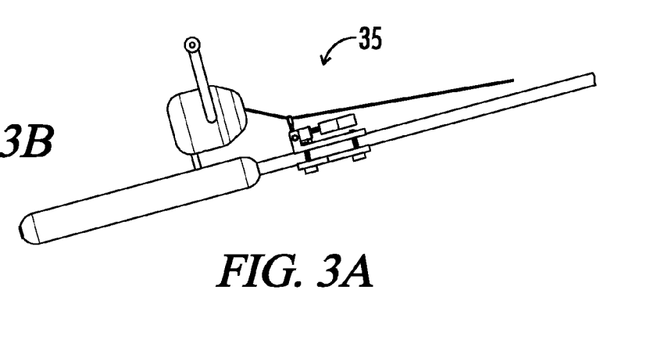
FIG. 3A illustrates function of the device of FIG. 2 on an under-the-rod configuration around the beginning of an overhead cast after the line has been inserted into the clamp.

As shown in FIG. 3A, when rod 13 is in start position 35 (i.e., the beginning of an overhead cast arc), line 16 is clamped between movable post 28 and stationary post 27 (FIG. 2B). The combination of weight 23, pivoting block 26 and movable post 28 form a lever.

Figures 3B, 3C:
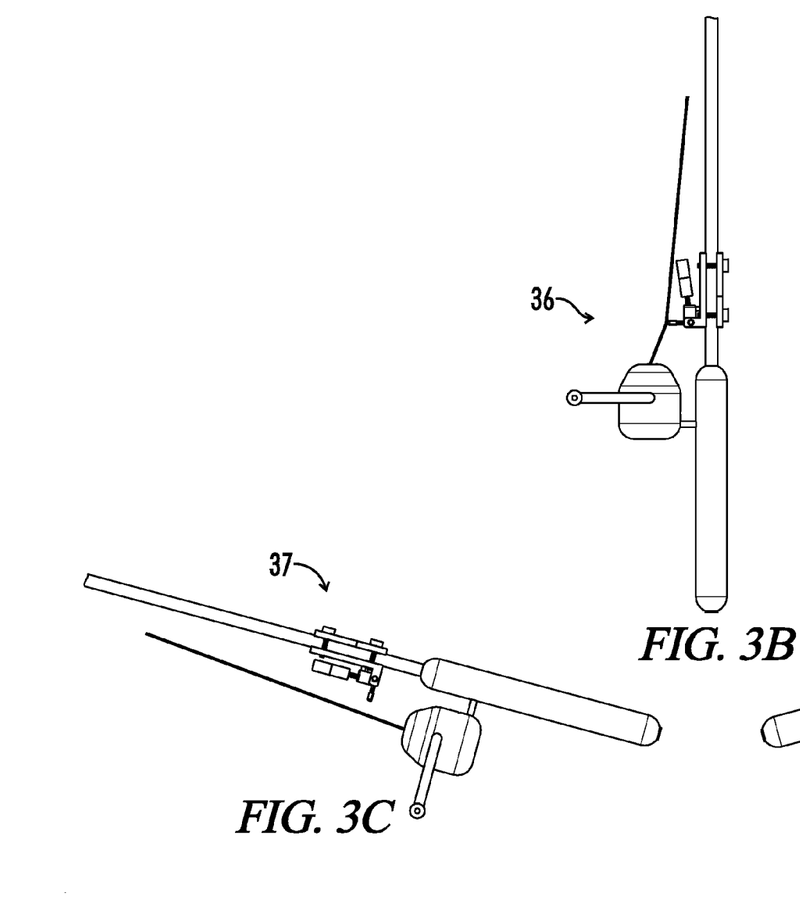
FIG. 3B illustrates function of the device of FIG. 3A around the peak of the overhead cast arc (i.e., approximately when the rod is decelerating in the arc).
FIG. 3C illustrates function of the device of FIG. 3A around the end of the overhead cast arc (i.e., approximately when the rod stops moving through the arc).

When rod 13 is accelerated through its arc, the inertia of weight 23 closes the lever even more forcefully against line 16. When rod 13 is decelerated in the arc, intermediate position 36 (as shown in FIG. 3B), the inertia of weight 23 makes weight rod 25 move forward (i.e., away from rod) and line 16 is released when posts 27 and 28 separate sufficiently for line 16 to slip out of clamp 15. When rod 13 stops moving through its arc, the lever returns to the neutral position and spring 29 closes clamp 15 as shown in final position 37 of FIG. 3C. After line 16 is reeled in, line 16 can be reinserted between movable post 28 and stationary post 27.

Under-the-rod device 10 is activated by forces generated by angular acceleration, it is beneficial to have under-the-rod device 10 in the proper orientation during the cast. Movable post 28 and stationary post 27 forming clamp 15 point towards the center axis of reel 14.

Figure 4:
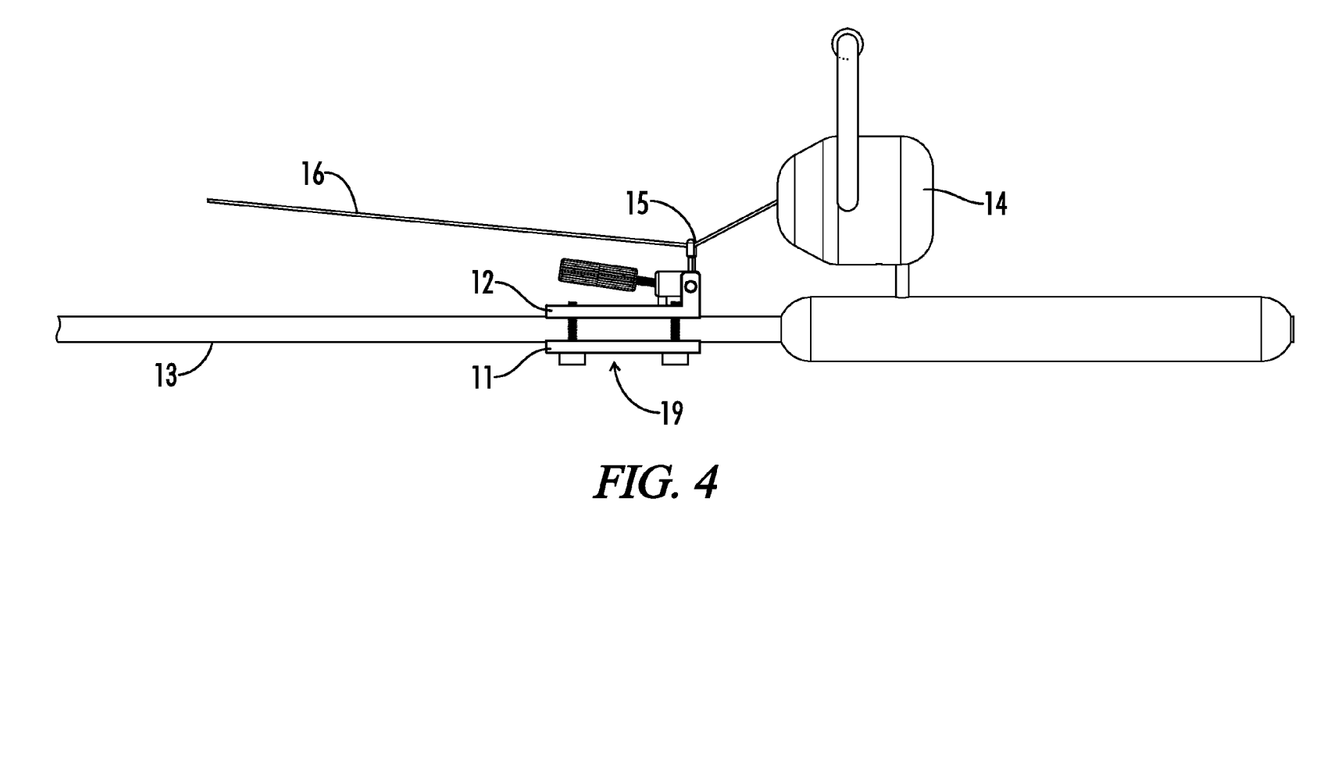
FIG. 4 is a side view of an automatic line release device in an over-the-rod configuration, with the fishing line placed into the clamp.
Figure 5A:
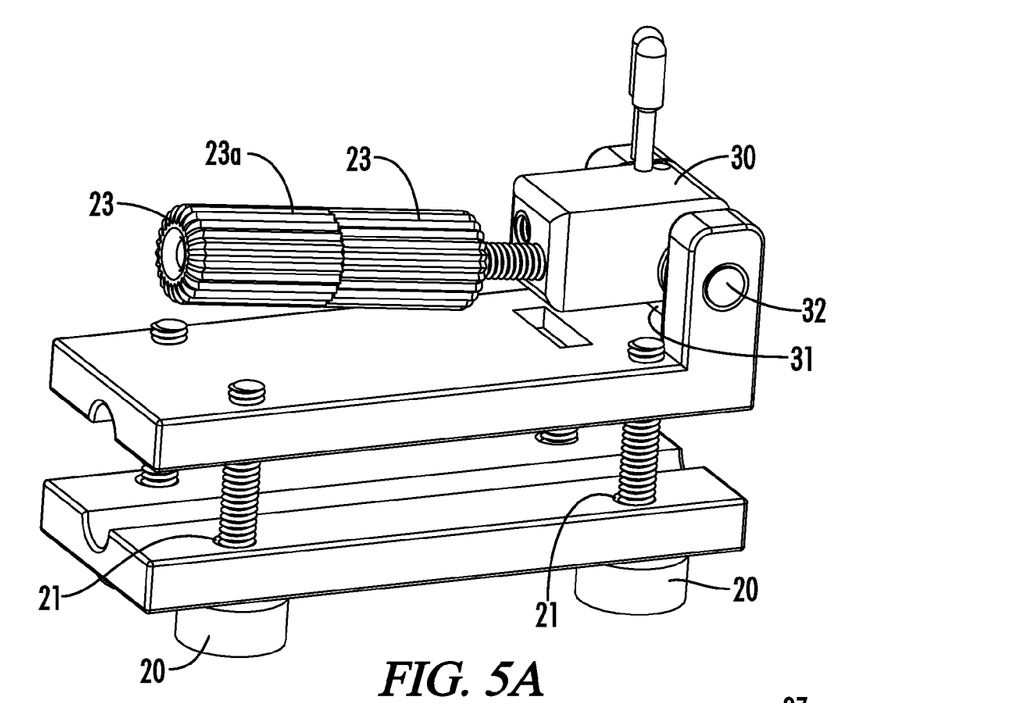
FIG. 5A is a side perspective view of the device of FIG. 4. The spring holds the weight in a position away from the rod (i.e., not parallel with the rod). The movable post is now slightly ahead of the stationary post (i.e., closer to the weight and/or further away from the reel).
Figure 5B:
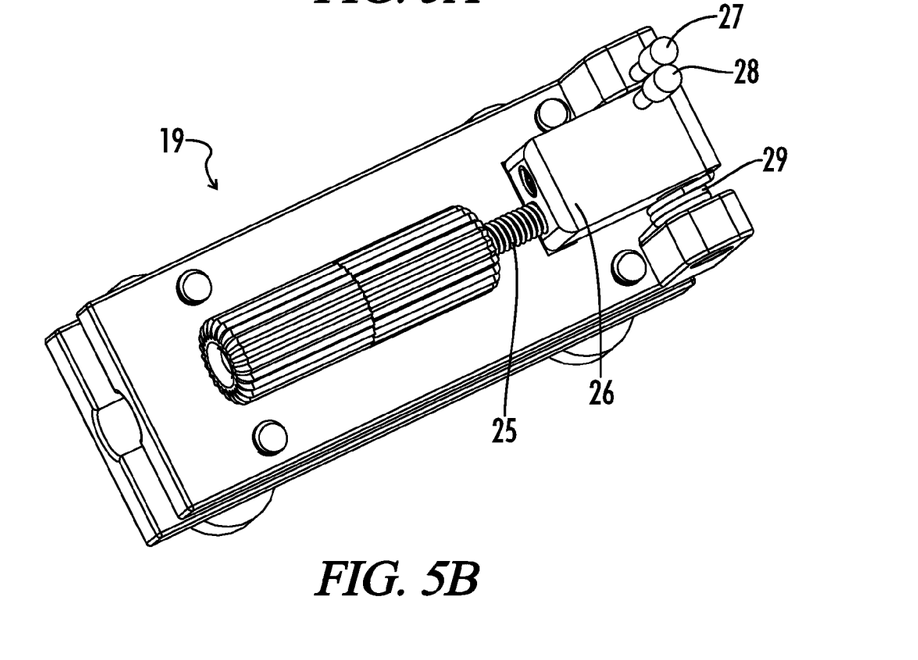
FIG. 5B is a top perspective of the device of FIG. 5A.

In an embodiment of the present disclosure, over-the-rod device 19 is combined with over the rod reels 14 which are held on top of rod 13, as shown in FIGS. 4, 5A and 5B. For this embodiment over-the-rod device 19 is mounted on top of rod 13. Movable post 28 is in front of stationary post 27. Spring 29 pushes weight 23 away from rod 13 (i.e., to an orientation not parallel to rod 13). Stop 31 is at the rear of the pivoting block 26 to limit upward travel. Weight rod 25 and weight 23 are slightly angled upwards to permit greater downward travel distance. In this position there is continued force closing clamp 15. During start of the cast and due to acceleration of rod 13, inertia of weight 23 adds to the force of spring 29 in closing clamp 15 on line 16. During deceleration of rod 13, inertia of weight 23 opens clamp 15 against (i.e., overcoming) force of spring 29.

Figure 6:
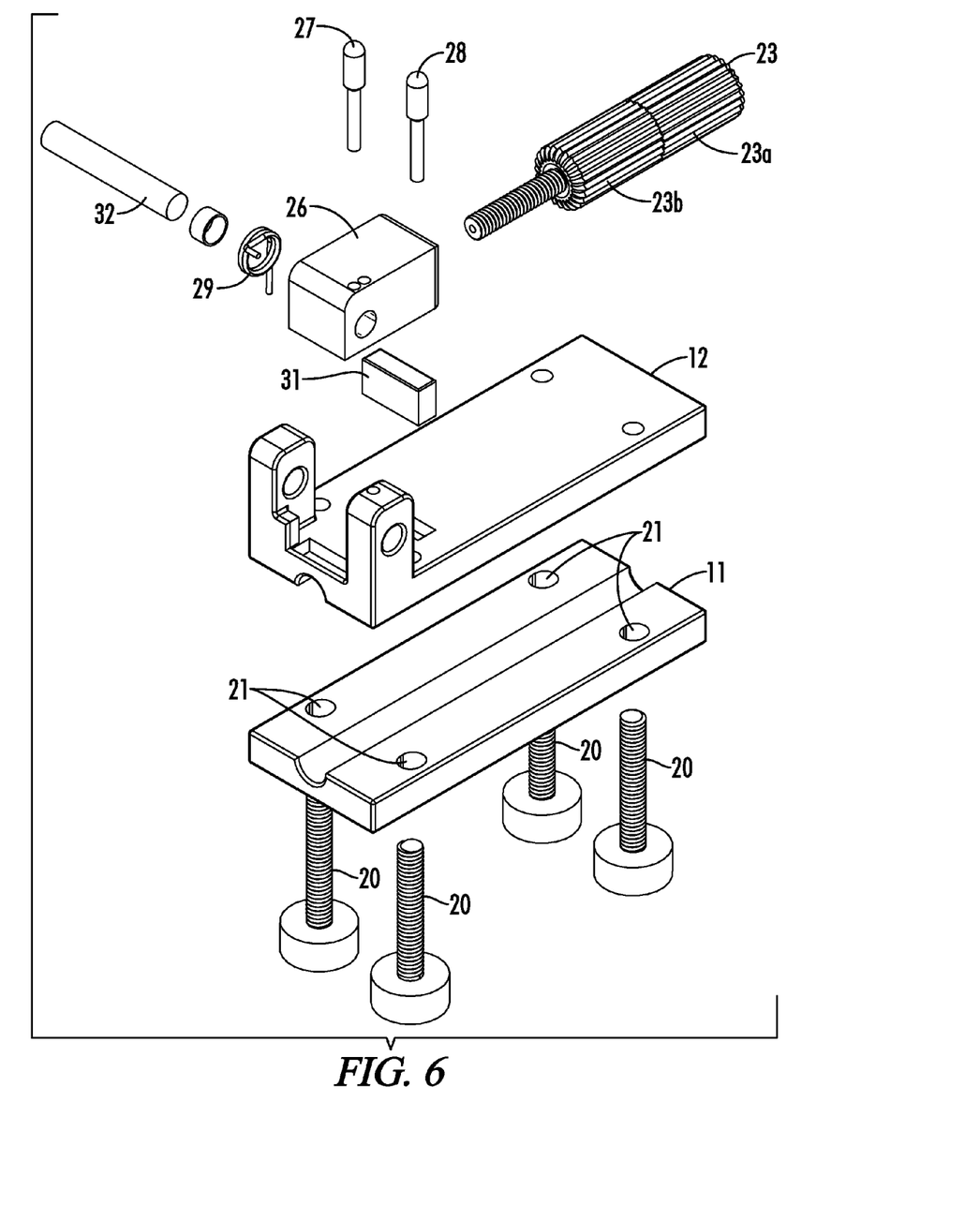
FIG. 6 is an exploded view of an embodiment of the automatic line release device.

In an embodiment of the present disclosure, changing the position of movable post 28 in pivoting block 26, changing the position of stop 31, and changing direction of spring 29 tension, reversibly converts over-the-rod device 19 to an under-the-rod device 10 and vice versa. As illustrated by FIG. 6, this interchangeable structure might be beneficial to reduce parts count during manufacturing or even be done by the end user.

In another embodiment of the present disclosure, a modification of over-the rod device 19 or under-the-rod device 10 can be configured for a sideways cast, in which two additional posts would point towards the reel when device 10 or 19 is rotated 90 degrees facing the direction of the cast.

In an embodiment of the present disclosure, a miniature version of device 10 or 19 is attached to reel 14. In yet another embodiment of the present disclosure, device 10 or 19 is not permanently attached to rod 13 or reel 14, both spring 29 tension and stop 31 are adjustable.

In yet another embodiment of the present disclosure, device 100 is shown which combines features of device 10 and device 19 into an adjustable mechanism. Device 100 shows how under-the-rod device 10 and over-the-rod device 19 can be retained precisely in one embodiment. Adjustment mechanism 110 includes a cylindrical shape with a plurality of protrusions on the exterior of the shape. Cylindrical shape also defines cylindrical void 102 for accommodating fastener 104 to reversibly affix mechanism 110 to plate 12. Regarding reversible affixation, adjustment mechanism 110 is configured to switch positions by lifting up and rotating mechanism 110 to adjust its orientation relative to device 100. Adjustment mechanism 110 is configured to be oriented on plate 12 such that one of two holes located on an end of adjustment mechanism rests on pin 112 of plate 12.

With respect to adjustment mechanism 110, protrusion 114 of mechanism 110 closest to plate 12 and defines hole 116 to receive end 118 of spring 120. Spring 120 tends to push pivoting block 26 and weight 23 down towards base 11, plate 12 and rod 13. As shown in FIG. 7B2, block 26 is resting on middle protrusion 122 of mechanism 110, while top protrusion 124 is not interacting with block 26. In this orientation, weight 23 is free to move away from base 11, plate 12, and rod 13.

Clamp posts are held together in the absence of angular deceleration. Posts 27 and 28 are touching or very close to one another, pinching any fishing line during clamping. Moveable post 28 is free to move past stationary post 27 in either direction upon rotation of pivoting block 26. In this orientation, device 100 functions similar to under-the-rod device 10.

Figure 7A:
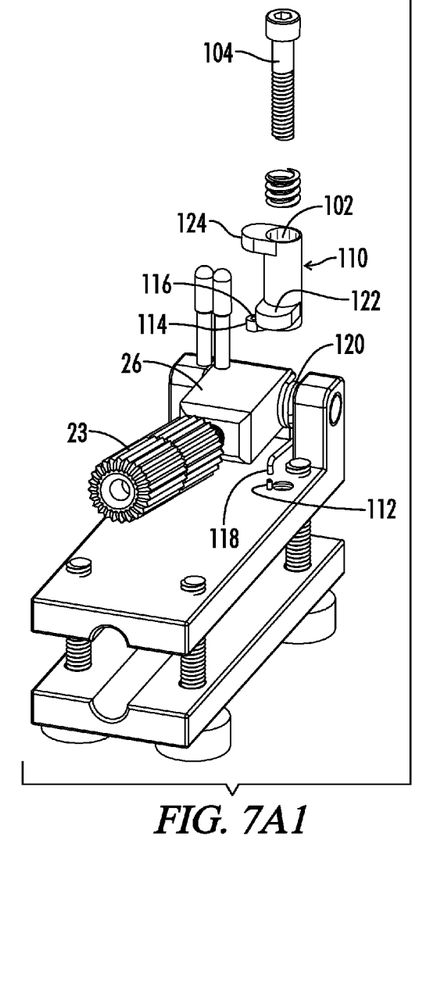
Figure 7A:
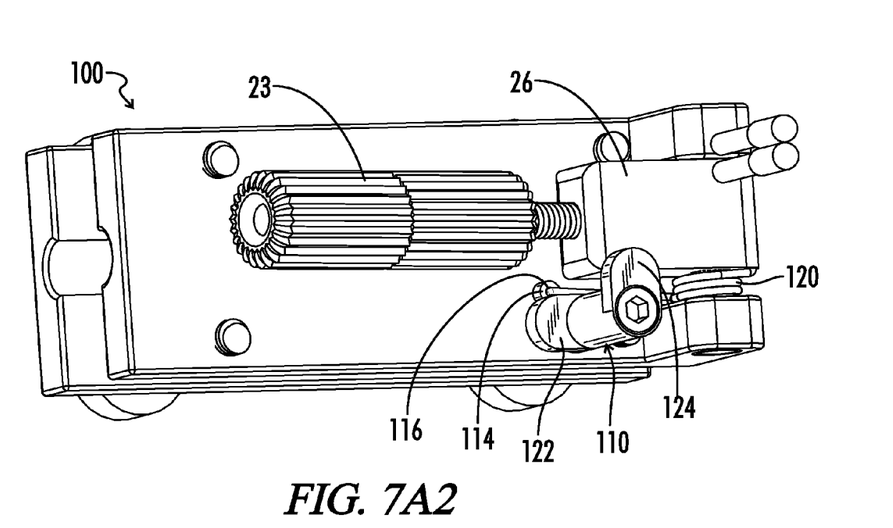
Figure 7B:
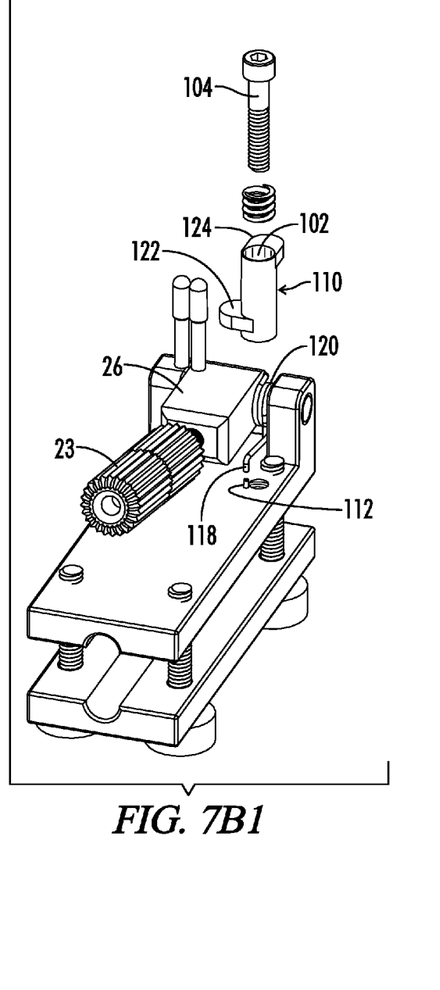
Figure 7B:
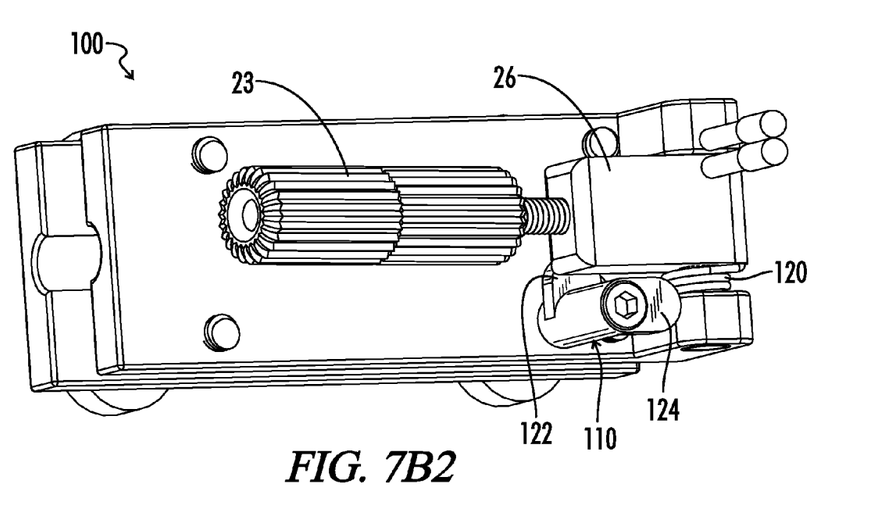

As shown in FIGS. 7A1 and 7A2, adjustment mechanism 110 is in a different orientation than adjustment mechanism illustrated in FIGS. 7B1 and 7B2. In this second orientation adjustment mechanism 110 has been oriented with the second of two holes put on pin 112 (i.e., a 90 degree counter-clockwise rotation relative to the orientation illustrated in FIGS. 7A1 and 7A2): In this second orientation, spring end 118 is pulled away from axle 32 which will tend to lift pivoting block 26 and weight 23 away from base 11, plate 12 and rod 13 as best illustrated by FIG. 7A2. As shown in FIG. 7A2, middle protrusion 122 is out of the way and not interacting with block 26 while top protrusion 124 acts as a stop to prevent pivoting block 26 from moving away from base 11, plate 12, and rod 13. In this second orientation, weight 23 is now free to move toward base 11, plate 12 and rod 13. In this second orientation, device 100 functions as over-the-rod device 19.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A device for releasing a fishing line during cast deceleration of the fishing rod comprising:
   a frame including a base and a plate configured to affix to a fishing rod,
   a pivoting block rotatably supported by the plate,
   a weight configuration including a weight rod supported by the pivoting block and a plurality of weight portions coupled to the weight rod,
   a stationary post supported by the plate,
   a moveable post supported by the pivoting block, wherein inertia of the weight portions during cast deceleration separates stationary post and moveable post enough to release fishing line.

2. The device of claim 1 wherein cast deceleration includes angular deceleration of the fishing rod.

3. The device of claim 1 wherein the stationary post is close to the moveable post.

4. The device of claim 1 wherein close means less than the diameter of either the stationary post or the moveable post.

5. The device of claim 1 wherein the configuration is under the fishing rod.

6. The device of claim 5 further comprising:
   an axis coupled to pivoting block to facilitate rotational movement of pivoting block relative to plate and fishing rod, and
   a spring coupled to plate and pivoting block biasing weight rod and weight to a parallel orientation with fishing rod.

7. The device of claim 1 wherein the configuration is over the fishing rod.

8. The device of claim 1 further comprising:
   an adjustable mechanism supported by the plate, the mechanism including a cylindrical shape with a plurality of protrusions from the exterior of the shape.

9. The device of claim 8 wherein the adjustment mechanism is capable of reversible affixation to the plate.

10. The device of claim 8 wherein the adjustment mechanism is configured to switch orientation relative to the rest of the device.

11. The device of claim 8 wherein the adjustable mechanism includes first protrusion close to plate, the first protrusion defining a hole to receive end of a spring, wherein spring pivots the block and the weight either toward or away from the rod.

12. The device of claim 11 wherein the adjustable mechanism includes a second protrusion configured to limit motion of the block toward the rod.

13. The device of claim 12 wherein the adjustable mechanism includes a third protrusion configured to limit motion of the block away from the rod.

14. The device of claim 13 wherein the orientation of the adjustable mechanism determines whether the second protrusion or the third protrusion interacts with the block.

15. The device of claim 8 wherein the orientation of adjustable mechanism determines whether device functions in coordination with placement under the fishing rod or over the fishing rod.

16. The device of claim 8 wherein the stationary post and the moveable post are approximately the same distance from a reel of the fishing rod.

17. A method of releasing a fishing line during angular deceleration of the fishing rod comprising the steps of:
   providing a device including a rotatably supported pivoting block, a weight supported by the pivoting block, a moveable post supported by the pivoting block,
   clamping the fishing line of the fishing rod between the moveable post and a stationary post,
   casting the device coupled to the fishing rod,
   separating the moveable post from the stationary post enough to release the fishing line during angular deceleration.

18. The method of claim 8 further comprising a delay in time between angular deceleration and release of the fishing line.

19. The method of claim 8 further comprising sensing of weakening positive acceleration during the acceleration phase of the cast.

20. The method of claim 10 wherein the weight is used to sense weakening positive acceleration.

* * * * *